United States Patent
Tojigamori

(10) Patent No.: US 8,945,771 B2
(45) Date of Patent: Feb. 3, 2015

(54) NEGATIVE-ELECTRODE ACTIVE MATERIAL COMPRISING A PSEUDOBROOKITE-STRUCTURED COMPOUND, NEGATIVE ELECTRODE AND BATTERY

(75) Inventor: Takeshi Tojigamori, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 175 days.

(21) Appl. No.: 13/611,617

(22) Filed: Sep. 12, 2012

(65) Prior Publication Data

US 2013/0071746 A1   Mar. 21, 2013

(30) Foreign Application Priority Data

Sep. 15, 2011   (JP) ................................ 2011-201548

(51) Int. Cl.
| | |
|---|---|
| *H01M 4/48* | (2010.01) |
| *H01M 4/52* | (2010.01) |
| *C01G 49/00* | (2006.01) |
| *C01G 23/00* | (2006.01) |
| *H01M 4/50* | (2010.01) |

(52) U.S. Cl.
CPC ............. *C01G 49/0018* (2013.01); *H01M 4/48* (2013.01); *H01M 4/52* (2013.01); *C01G 23/003* (2013.01); *H01M 4/50* (2013.01); *C01P 2002/72* (2013.01); *C01P 2006/40* (2013.01); *Y02E 60/122* (2013.01)
USPC ......................... 429/221; 429/218.1; 429/232

(58) Field of Classification Search
USPC ...................... 429/122, 221, 199, 232, 218.1; 252/518.1; 423/594.1, 263
See application file for complete search history.

(56) References Cited

U.S. PATENT DOCUMENTS

| | | | | |
|---|---|---|---|---|
| 3,941,668 A | * | 3/1976 | Allan ............................ | 205/546 |
| 4,366,215 A | * | 12/1982 | Coetzer et al. ................ | 429/199 |
| 2005/0221170 A1 | * | 10/2005 | Takeuchi et al. .............. | 429/122 |

FOREIGN PATENT DOCUMENTS

| | | |
|---|---|---|
| JP | A-10-251020 | 9/1998 |
| JP | A-2009-199798 | 9/2009 |
| JP | A-2011-86464 | 4/2011 |

OTHER PUBLICATIONS

Steiner et al., "Phase Relationships and Electrical Properties of $Ti_3O_5$, $CrTi_2O_5$ and the Pseudobrookite-type Systems $Mg_xTi_{3-x}O_5$ and $Li_xTi_{3-x}O_5$", Journal of Material Chemistry, 2(12), 1992, p. 1249-1256.*

"Synthesis and Lithium Insertion into Nanophase $MgTi_2O_5$ with Pseudo-Brookite Structure", Reddy et al., Chem. Mater. 2008, 20, 2192-2197.*

* cited by examiner

*Primary Examiner* — Kenneth Douyette
(74) *Attorney, Agent, or Firm* — Oliff PLC

(57) ABSTRACT

A negative-electrode active material includes a compound that has a pseudobrookite structure.

11 Claims, 5 Drawing Sheets

COMPARATIVE EXAMPLE

COMPARATIVE EXAMPLE

NEGATIVE-ELECTRODE ACTIVE MATERIAL COMPRISING A PSEUDOBROOKITE-STRUCTURED COMPOUND, NEGATIVE ELECTRODE AND BATTERY

INCORPORATION BY REFERENCE

The disclosure of Japanese Patent Application No. 2011-201548 filed on Sep. 15, 2011 including the specification, drawings and abstract is incorporated herein by reference in its entirety.

BACKGROUND OF THE INVENTION

1. Field of the Invention

The present invention relates to a negative-electrode active material which has a low potential relative to lithium.

2. Description of Related Art

In recent years, a high-output and high-capacity power source which is applicable to low-emission vehicles, such as electrical vehicles and hybrid vehicles, is demanded from an environmental conservation perspective. In addition, in fields other than automobiles, the global diffusion of mobile tools, such as information-related devices and communication devices, stimulates the necessity of a power source which cart enhance the performance of the mobile tools. One of promising high-performance power sources is a lithium batter, which has a high energy density and is operable at a high voltage.

A lithium battery has a voltage equal to the difference between the potential of its positive-electrode material relative to lithium and the potential of its negative-electrode material relative to lithium. In other words, a high voltage and a high output can be obtained from the battery and the energy density increases when the potential of the negative-electrode material (in particular, the negative-electrode active material) is decreased. However, too much reduction in the potential of the negative-electrode active material relative to that of lithium may lead to precipitation of metal lithium in the batter. For example, graphite, which has a potential of 0 V relative to lithium, causes precipitation of metal lithium while in use.

One possible solution for preventing precipitation of metal lithium is to increase the operating voltage to a level at which metal lithium does not precipitate (in other words, to use a negative-electrode active material which has a high potential relative to lithium). Some batteries use spinel-type lithium titanate ($Li_4Ti_5O_{12}$) or a partial substitution product thereof, which are typical examples of this type of negative-electrode active material (Japanese Patent Application Publication No. 2009-199798 (JP 2009-199798 A), Japanese Patent Application Publication No. 2011-086464 (JP 2011-086464 A), and Japanese Patent Application Publication No. 10-251020 (JP 10-251020 A)). Such materials have already been in practical use in some applications.

Spinel-type lithium titanate has a potential of 1.5 V relative to lithium and does not cause precipitation of metal lithium, but has too high a potential to be used as a negative-electrode active material. In other words, as battery which uses spinel-type lithium titanate as a negative-electrode active material is not suitable to obtain a high voltage and a high output.

$TiO_2$ and $Fe_2O_3$ are some other examples, in addition to spinel-type lithium titanate, of transition metal oxides that can be used as a negative-electrode active material, but they have a high potential of approximately 1.8 V and 1.3 V, respectively, relative to lithium. In other words, a battery which uses $TiO_2$ or $Fe_2O_3$ as a negative-electrode active material is not suitable either to obtain a high voltage and a high output.

SUMMARY OF THE INVENTION

The present invention provides a negative-electrode active material which has a low potential relative to lithium.

The present inventors conducted earnest studies and, consequently, reached the following conclusions. (1) A negative-electrode active material tends to have a higher oxidation-reduction potential because of no inductive effect as the ionicity of the bond between a transition metal and oxygen in the active material is higher. In other words, it is inferred that the ionicity of Ti—O bonds in spinel-type lithium titanate or $TiO_2$ is high and the ionicity of Fe—O bonds in $Fe_2O_3$ is high. (2) When a negative-electrode active material includes cations (B) which do not contribute to a charge-discharge reaction or are relatively less likely to contribute to a charge-discharge reaction than transition metal atoms (A), in addition to the transition metal atoms (A), which contribute to a charge-discharge reaction or are relatively more likely to contribute to a charge-discharge reaction than the metal atoms (B), the negative-electrode active material has a low potential relative to lithium, it is believed that because ionic bonds are formed between the cations (B) and oxygen atoms in the negative-electrode active material, the ionicity of the bonds between the transition metal atoms (A) and the oxygen atoms is lowered, which leads to an increase in the covalency of the bonds between the transition metal, atoms (A) and the oxygen atoms, resulting in a decrease in the oxidation-reduction potential of the negative-electrode active material. (3) More specifically, when a compound which has a pseudobrookite structure including two types of cations is used as a negative-electrode active material, a negative-electrode active material which has a low potential relative to lithium can be obtained because of the above principle.

A first aspect of the present invention provides a negative-electrode active material which includes a compound that has a pseudobrookite structure.

The term "pseudobrookite structure" refers to a structure which has a space group BBMM, CCMM, CMCM, PNMA or PBCN and includes at least two types of cations. At least one type of cations out of the at least two types of cations is relatively more likely to contribute to a charge-discharge reaction than the other cations, and the other cations are relatively less likely to contribute to a charge-discharge reaction than the at least one type of cations.

The compound may be a compound that is represented by a composition formula $A_2BO_5$. In other words, the negative-electrode active material may include a compound that is represented by a composition formula $A_2BO_5$. The composition which "includes a compound that is represented by a composition formula $A_2BO_5$" is a concept that includes (a) a composition which includes a single-phase compound $A_2BO_5$ that is obtained by mixing A and B at a ratio of A:B=2:1 and calcining the mixture, and (b) a composition (composite) which includes a compound $A_2BO_5$, another composite oxide composed of A and B, or a mixture of oxides of A and B that is obtained by mixing A and B at a ratio of A:B=1:x (x=0.5 to 1.5) and calcining the mixture. Whether or not the negative-electrode active material includes a compound that has a pseudobrookite structure can be determined easily by for example, X-ray diffraction measurement.

Specific examples of $A_2BO_5$ include the following. When A is a divalent cation (such as $Ba^{2+}$), B is a hexavalent cation (such as $W^{6+}$). When A is a trivalent cation (such as $Al^{3+}$, $Cr^{3+}$, $Fe^{3+}$, $Sc^{3+}$, $Ga^{3+}$, $In^{3+}$ or $Bi^{3+}$), B is a tetravalent cation (such as $Si^{4+}$, $Ti^{4+}$, $V^{4+}$ or $Ge^{4+}$). When A is a tetravalent cation (such as $Ti^{4+}$, $V^{4+}$, $Se^{4+}$, $Zr^{4+}$ or $Te^{4+}$), B is a divalent cation (such as $Mg^{2+}$, $Ba^{2+}$, $Cr^{2+}$, $Cu^{2+}$, $Mn^{2+}$ or $Co^{2+}$).

The compound may be $Fe_2TiO_5$.

The compound may be $Sc_2TiO_5$.

A second aspect of the present invention provides a negative electrode which includes the negative-electrode active material according to the first aspect of the present invention.

A third aspect of the present invention provides a battery which includes a negative electrode according to the second aspect of the present invention.

According to the present invention, it is possible to provide a negative-electrode active material which has a low potential relative to lithium. A negative electrode that uses the negative-electrode active material has a large capacity, and a battery that uses the negative electrode is a high-output and high potential battery with a high energy density. The negative-electrode active material according to the present invention has a higher potential, relative to lithium, than graphite and therefore does not cause precipitation of metal lithium while in use when used in a lithium battery, for example.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

1. Negative-Electrode Active Material

Figure 1A:
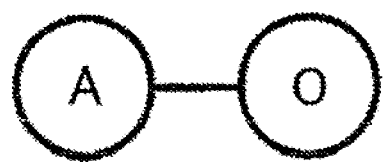
FIG. 1A is a diagram that illustrates a transition metal oxide-type negative-electrode active material of a comparative example.
Figure 1B:
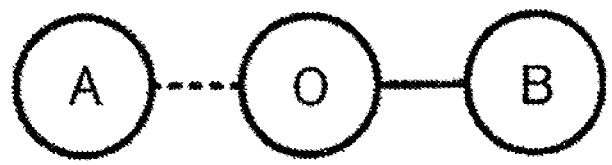
FIG. 1B is a diagram that illustrates a negative-electrode active material according to the present invention.

In general, when a transition metal oxide is used as a negative-electrode active material, its oxidation-reduction potential tends to be higher because of an inductive effect as the ionicity of the bond between the transition metal and oxygen is higher. In other words, a negative-electrode active material in which a transition metal A is ionically bonded to oxygen as shown, in FIG. 1A has a high oxidation-reduction potential. Spinel-type lithium titanate. $TiO_2$ and $Fe_2O_3$ as comparative examples are of this type. These substances have a high potential of 1.5 V, 1.8 V and 1.3 V, respectively, relative to lithium because the Ti—O bonds or Fe—O bonds in these substances are highly ionic. In contrast, in the negative-electrode active material according to this embodiment of the present invention, cations (B) other than transition metal atoms (A) that contribute to an oxidation-reduction reaction are added to form ionic bonds between the cations (B) and the oxygen atoms as shown in FIG. 1B in order to lower the ionicity of the bonds between the transition metal atoms (A) and the oxygen atoms intentionally. It is believed that this increases the covalency of the bonds between the transition metal atoms (A) and the oxygen atoms, which suppresses the inductive effect, resulting in a decrease in the oxidation-reduction potential of the negative-electrode active material. The present invention has been made based on this technical idea and provides a negative-electrode active material which includes a compound that has a pseudobrookite structure.

The term "pseudobrookite structure" refers to a structure which has a space group BBMM, CCMM, CMCM, PNMA or PBCN and includes at least two types of cations. At least one type of cations out of the at least two types of rations is relatively more likely to contribute to a charge-discharge reaction than the other cations, and the other cations are relatively less likely to contribute to a charge-discharge reaction than the at least one type of cations.

The negative-electrode active material according to this embodiment has a pseudobrookite structure in at least a portion thereof and preferably includes a compound that is represented by a composition formula $A_2BO_5$. The composition which "includes a compound that is represented by a composition formula $A_2BO_5$" is a concept that includes (a) a composition which includes a single-phase compound $A_2BO_5$ that is obtained by mixing A and B at a ratio of A:B=2:1 and calcining the mixture, and (b) a composition (composite) that includes a compound $A_2BO_5$, another composite oxide composed of A and B, or a mixture of oxides of A and B, which is obtained by mixing A and B at a ratio of A:B 1:x (x=0.5 to 1.5) and calcining the mixture. Whether or not the negative-electrode active material includes a compound that has a pseudobrookite structure can be determined easily by, for example, X-ray diffraction measurement.

When A is a divalent cation (such as $Ba^{2+}$). B is a hexavalent cation (such as $W^{6+}$). When A is a trivalent cation (such as $Al^{3+}$, $Cr^{3+}$, $Fe^{3+}$, $Sc^{3+}$, $Ga^{3+}$, $In^{3+}$ or $Bi^{3+}$), B is a tetravalent cation (such as $Si^{4+}$, $Ti^{4+}$, $V^{4+}$ or $Ge^{4+}$). When A is a tetravalent cation (such as $Ti^{4+}$, $V^{4+}$, $Se^{4+}$, $Zr^{4+}$ or $Te^{4+}$), B is a divalent cation (such as $Mg^{2+}$, $Ba^{2+}$, $Cr^{2+}$, $Cu^{2+}$, $Mn^{2+}$ or $Co^{2+}$). Above all $Fe_2TiO_5$, $Sc_2TiO_5$, $Ti_2BeO_5$, $Bi_2GeO_5$, $Bi_2VO_5$, $Ba_2WO_5$, $Se_2CoO_5$, $Se_2CuO_5$, $In_2TiO_5$, $Fe_2SiO_5$, $Ti_2MgO_5$ and $Ti_2CoO_5$ are preferred, and $Fe_2TiO_5$ and $Sc_2TiO_5$ are more preferred. $Fe_2TiO_5$ is preferred because it can be synthesized from an iron oxide and a titanium oxide and is therefore inexpensive.

The negative-electrode active material according to this embodiment can be obtained by, for example, preparing and mixing desired oxides (for example, $Fe_2O_3$ and $TiO_2$, or $Sc_2TiO_3$ and $TiO_2$) and calcining the mixture in an air atmosphere in such a way that the resulting compound will partially, preferably entirely, have a pseudobrookite structure. The calcination temperature and calcination time are not specifically limited and may be appropriately adjusted. For example, $Fe_2TiO_5$ or $Sc_2TiO_5$ can be produced by mixing the oxide ingredients, pressing the mixture (at a pressing pressure of 5 kN or higher, for example) into pellets, calcining the pellets in an sir atmosphere (at 1000° C. or higher, for example), maintaining the pellets at the calcination temperature for a predetermined period of time (10 hours, for example), and cooling the calcination product by, for example, natural cooling. The resulting negative-electrode active material is preferably pulverized and refined (into powder) in, for example, a ball mill before use.

The negative-electrode active material according to this embodiment can be suitably used not only as a negative-electrode active material of lithium batteries but also as a negative-electrode active material of various batteries, such as sodium batteries, potassium batteries, magnesium batteries and calcium batteries.

Because the negative-electrode active material according to this embodiment includes a compound that has a pseudo-brookite structure, cations which to not contribute to an oxidation-reduction reaction or are relatively less likely to contribute to an oxidation-reduction reaction than other cations that constitute the negative-electrode active material form ionic bonds with oxygen and increase the covalency of the bonds between the cations contribute to an oxidation-reduction reaction and oxygen. As a result, the oxidation-reduction potential of the active material decreases, resulting in a negative-electrode active material which has a low potential relative to lithium. In addition, as described in the section of Examples later, the present inventors have found, as a result of earnest studies, that the negative-electrode active material according to this embodiment has a high capacity. When such a negative-electrode active material is used in a battery, a high voltage and a high output can be obtained from the battery and the total energy density of the battery improves.

2. Negative Electrode

A negative electrode which includes the negative-electrode active material according to this embodiment has a low potential relative to lithium and a high capacity. Thus, when a battery is produced using the negative electrode, a high-voltage and high-output battery can be obtained. The negative electrode can be suitably used not only as a negative electrode of lithium batteries but also as a negative electrode of various batteries, such as sodium batteries, potassium batteries, magnesium batteries and calcium batteries.

The form of the negative electrode is not specifically limited as long as the negative electrode includes the negative-electrode active material according to this embodiment. For example, the negative electrode may be produced by forming a negative electrode layer of a negative-electrode material which optionally includes a conductive aid and/or a binder in addition to the negative-electrode active material and optionally providing a negative electrode current collector on the negative electrode layer.

As the conductive aid, any conductive aid that has been used in negative electrodes may be used without limitation. For example, a carbon material, such as carbon black, Ketjen black, acetylene black, mesocarbon microbeads (MCMB), coke, carbon fibers or graphite, may be used. The use of a refined conductive aid is preferred. For example, the use of a conductive aid with an average particle diameter of 2 μm or smaller, preferably 0.1 μm or greater and 1 μm or smaller, is preferred. This further improves the electrical conductivity. The content of the conductive aid is not specifically limited as long as the performance of the resulting battery is not interfered with. For example, the content of the conductive aid is preferably 1% by mass or greater and 50% by mass or less, more preferably 2% by mass or greater and 40% by mass or less, based on the total amount of the negative-electrode material, which is taken as 100% by mass.

As the binder, any binder that has been used in negative electrodes may be used without limitation. For example, a fluorine-including resin, such as polyvinylidene fluoride (PVDF) or polytetrafluoroethylene (FIFE), or an acrylic resin may be used. The content of the hinder is not specifically limited as long as the per of the resulting battery is not interfered with. For example, the content of the binder is preferably 10% by mass or less, more preferably 1% by mass or greater and 5% by mass or less, based on the total amount of the negative-electrode material, which is taken as 100% by mass.

As the negative electrode current collector, a well-known negative electrode current collector may be used without limitation. For example, a negative electrode current collector that is made of stainless steel, copper, nickel or carbon may be used. The shape of the negative electrode current collector is not specifically limited. For example, the negative electrode current collector may be in the form of a plate, foil or mesh.

The method for the production of the negative electrode is not specifically limited as long as the negative-electrode active material according to the present invention is used. For example, the negative electrode can be produced by various methods, such as (a) by pressing the negative-electrode material into a negative electrode layer and optionally placing it on a surface of a negative electrode current collector, (b) by pressing the negative-electrode material together with a negative electrode current collector into a desired shape, and (c) by dispersing the negative-electrode material in a solvent to prepare a negative electrode-forming coating liquid, applying the coating liquid to a surface of a negative electrode current collector and drying the coating liquid. The thickness of the negative electrode is not specifically limited. For example, the thickness is preferably 0.1 μm or greater and 1000 μm or smaller.

3. Battery

A battery according to this embodiment includes a positive electrode, and electrolyte layer, and the negative electrode according to this embodiment. The configuration of the battery is not specifically limited as long as the electrolyte layer is interposed between the positive electrode and the negative electrode to allow ion conduction between the positive electrode and the negative electrode.

3.1. Negative Electrode

As the negative electrode, the negative electrode according to this embodiment is used. The details have been described above and are not repeated here.

3.2. Positive Electrode

The positive electrode includes a positive electrode layer that includes a positive-electrode active material and so on, and optionally has a positive electrode current collector that collects current from the positive electrode. The positive electrode layer is a layer that includes at least a positive-electrode active material and may optionally include at least one of a conductive aid and a binder as needed. Examples of the positive-electrode active material that can be used Co produce a lithium battery include layered positive-electrode active materials such as $LiCoO_2$, $LiNiO_2$, $LiCo_{1/3}Ni_{1/3}Mn_{1/3}O_2$, $LiVO_2$ and $LiCrO_2$, spinel-type positive-electrode active materials such as $LiMn_2O_4$, $Li(Ni_{0.25}Mn_{0.75})_2O_4$, $LiCoMnO_4$ and $Li_2NiMn_3O_8$, and olivine-type positive-electrode active materials such as $LiCoPO_4$, $LiMnPO_4$ and $LiFePO_4$. The content of the positive-electrode active material in the positive electrode layer, which is not specifically limited, is preferably in a range of 40% by mass to 99% by mass, for example.

The positive electrode layer may additionally include at least one of a conductive aid and a binder. As the conductive aid and binder, any suitable ones that are selected from those that are listed as examples that can be used in the negative electrode layer may be used.

The positive electrode optionally includes a positive electrode current collector. As the positive electrode current collector, a well-known positive electrode current collector may be used without limitation. For example, a positive electrode current collector that is made of stainless steel, aluminum, nickel; iron, titanium or carbon may be used. The shape of the positive electrode current collector is not specifically limited. For example, the positive electrode current collector may be in the form of a plate, fell or mesh.

The positive electrode may be produced by the same method as that which is used to produce the negative electrode. For example, the positive electrode can be produced by various methods, such as (a) by pressing the positive-electrode active material into a positive electrode layer and optionally placing it on a surface of a positive electrode current collector, (b) by pressing the positive-electrode active material together with a positive electrode current collector into shape, and (c) by dispersing the positive-electrode active material in a solvent to prepare a positive electrode-forming coating liquid, applying the coating liquid to a surface of a positive electrode current collector and drying the coating liquid. The thickness of the positive electrode is not specifically limited. For example, the thickness is preferably 0.1 μm or greater and 1000 μm or smaller.

3.3. Electrolyte Layer

The electrolyte layer is a layer that is interposed between the positive electrode layer and the negative electrode layer and includes at least an electrolyte. Metal ions are conducted between the positive-electrode active material and the negative-electrode active material via the electrolyte that is included in the electrolyte layer. The electrolyte layer, which is not specifically limited, is preferably a liquid electrolyte layer. However, the electrolyte layer may be a solid electrolyte layer or may be composed of a combination of a liquid electrolyte layer and a solid electrolyte layer.

A liquid electrolyte layer is a layer that is usually composed of art electrolytic solution. An electrolytic solution usually includes a metal salt, and water or a non-aqueous solvent. The type of the metal salt is preferably selected as appropriate depending on the type of the battery. Examples of thermal salt that is used in a lithium battery include inorganic lithium salts such as $LiPF_6$, $LiBF_4$, $LiClO_4$ and $LiAsF_6$; and organic lithium salts such as $LiCF_3SO_3$, $LiN(CF_3SO_2)_2$, $LiN(C_2F_5SO_2)_2$ and $LiC(CF_3SO_2)_3$. Examples of the non-aqueous solvent include ethylene carbonate (EC), propylene carbonate (PC), dimethyl carbonate (DMC), diethyl carbonate (DEC), ethylmethyl carbonate (EMC), butylene carbonate (BC), γ-butyrolactone, sulfolane, acetonitrile, 1,2-dimethoxymethane, 1,3-dimethoxypropane, diethyl ether, tetrahydrofuran, 2-methyltetrahydrofuran, and mixtures of these compounds. The concentration of the metal salt in the non-aqueous electrolytic solution is preferably in the range of 0.5 mol/L to 3 mol/L, for example. In this embodiment, a low-volatile liquid, such as an ionic liquid, may be used as the non-aqueous electrolytic solution. A separator may be provided between the positive electrode layer and the negative electrode layer. The thickness of the electrolyte layer, which differs significantly depending on the type of the electrolyte and the configuration of the battery, is preferably range of 0.1 μm to 1000 μm, more preferably in the range of 0.1 μm to 300 μm, for example.

The battery may have the same configuration as a conventional battery except that it includes a negative electrode that includes the negative-electrode active material according to this embodiment. For example, the battery may be produced by preparing a negative electrode and a positive electrode separately and accommodating negative electrode layer and a positive electrode layer in a battery case with an electrolyte layer interposed therebetween. Alternatively, the battery may be produced by accommodating a laminate that is formed by laminating the materials such that a negative electrode, an electrolyte layer and a positive electrode are stacked in this order and pressing the layers into shape in a battery case. Alternatively, the battery may be produced by laminating the materials and winding the laminate. The material and shape of the battery case are not specifically limited and may be suitably selected depending on the intended use of the battery.

The battery according to the present invention may be a sodium battery, potassium battery, magnesium battery or calcium battery instead of a lithium battery. The battery according to this embodiment can be used as a battery for a vehicle. The shape of the battery is not specifically limited. For example, the battery may be in the form of a coin, laminate, cylinder or box.

As described above, the battery according to this embodiments which includes a negative electrode which includes the negative-electrode active material according to this embodiment, is a high-voltage and high-output battery which has a high negative electrode capacity and a high energy density. In addition, because the potential of the negative-electrode active material relative to lithium is not too low compared to that of graphite, precipitation of metal lithium during use is suppressed.

While the negative-electrode active material according to this embodiment is described in more detail based on examples, the present invention is not limited to the specific forms that are described below.

1. Preparation of Active Material 1.1. Example 1

As an active material, $Sc_2TiO_5$ was prepared. Specifically, scandium oxide ($Sc_2O_3$, manufactured by Sigma-Aldrich Co, LLC.) and titanium oxide ($TiO_2$-rutile type, manufactured by Sigma-Allrich Co. LLC) were weighed and mixed at the stoichiometric ratio of $Sc_2TiO_5$. The mixture was pressed at 30 MPa into pellets. The pellets were calcined in an air atmosphere. The calcination conditions were as follows: the pellets were heated to 1100° C. over three hours, maintained at the temperature for 10 hours, and cooled by natural cooling.

1.2. Example 2

As an active material, $Fe_2TiO_5$ was prepared. Specifically, iron oxide ($Fe_2O_3$, manufactured by Wako Pure Chemical Industries, Ltd.) and titanium oxide ($TiO_2$-rutile type, manufactured by Sigma-Aldrich Co. LLC.) were weighed and mixed at the stoichiometric ratio of $Fe_2TiO_5$. The mixture was pressed at 30 MPa into pellets, which were calcined in an air atmosphere. The calcination conditions were as follows: the pellets were heated to 1100° C. over three hours, maintained at the temperature for 10 hours; and cooled by natural cooling.

2. Evaluation of Prepared Active Materials 2.1. X-Ray Diffraction Measurement

Figure 2A:
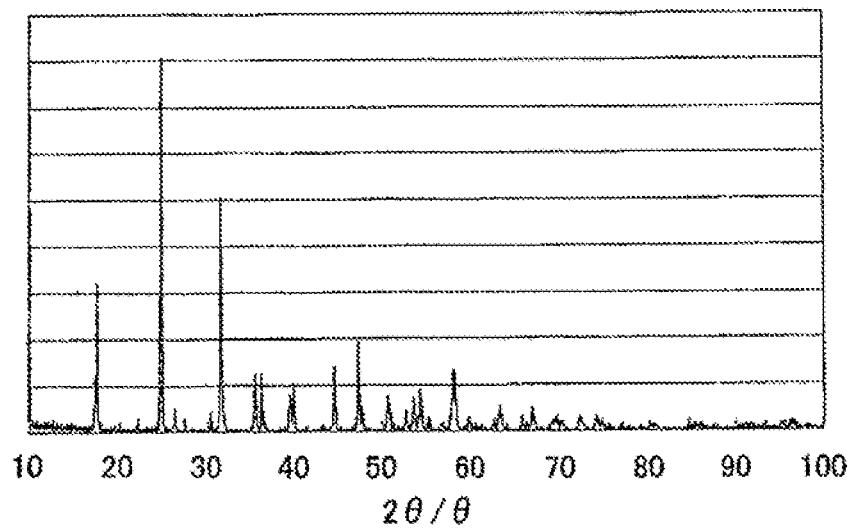
FIG. 2A is a graph that shows the result of X-ray diffraction measurement on $Sc_2TiO_5$ that was used in an example.
Figure 2B:
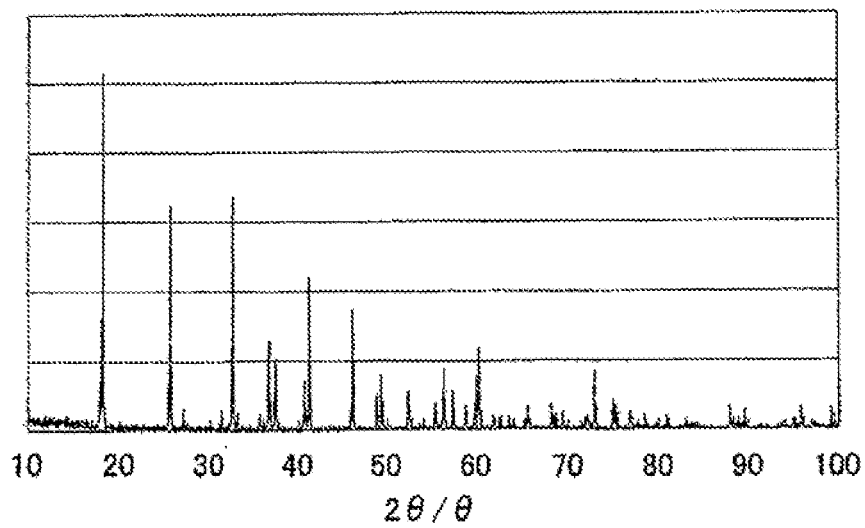
FIG. 2B is a graph that shows the result of X-ray diffraction on $Fe_2TiO_5$ that was used in another example.

An X-ray diffractometer (manufactured by Rigaku Corporation) was used to obtain single-crystal X-ray diffraction patterns of the active materials of Examples 1 and 2. The results are shown in FIG. 2. FIG. 2A shows the single-crystal X-ray diffraction pattern of the active material of Example 1, and FIG. 2B shows the single-crystal X-ray diffraction pattern of the active material of Example 2.

As shown in FIG. 2A, the active material of Example 1 had diffraction peaks in the vicinity of 17.5°, 24.8°, 31.5°, 35.4°, 36.2°, 39.7°, 44.5°, 47.2°, 54.2° and 57.9°. This X-ray diffraction pattern indicates that the active material of Example 1 was $Sc_2TiO_5$ with a pseudobrookite structure. As shown in FIG. 2B, the active material of Example 2 had diffraction peaks in the vicinity of 18.1°, 25.5°, 32.5°, 36.7°, 37.4°, 41.1°, 46.0°, 48.8°, 56.1° and 60.2°. This X-ray diffraction pattern indicates that the active material is $Fe_2TiO_5$ with a pseudobrookite structure.

2.2. Charge-Discharge Test

2.2.1. Preparation of Coin Cell for Evaluation

Figure 3:
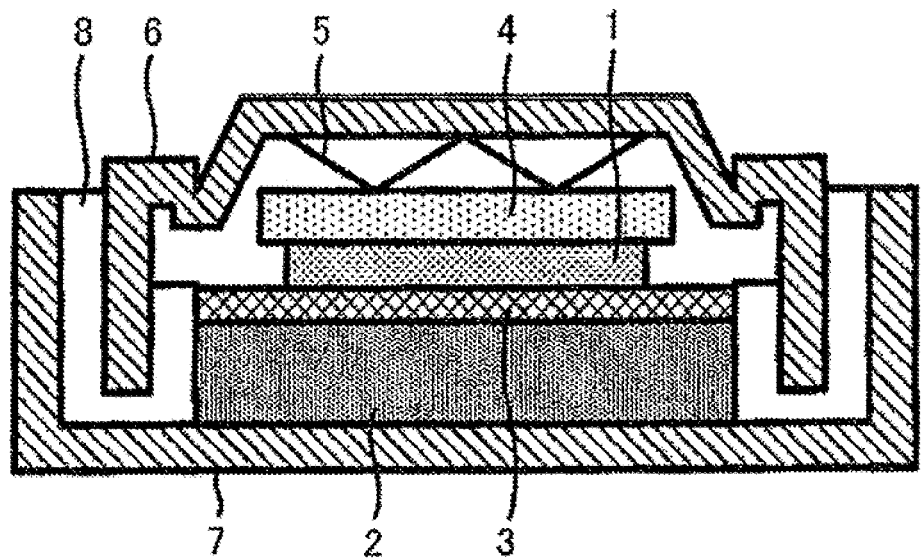
FIG. 3 is a schematic view that illustrates a coin-type battery that was used in examples.

A coin cell (2032-type coin cell, made of SUS316L, manufactured by KeihinRika Industry Co., LTD.) as shown in FIG. 3 was used to conduct a charge-discharge test on the active materials of Examples to measure the potential relative to lithium of the active materials and so on. The coin cell fabrication conditions were as follows. As a positive electrode a mixture that was obtained by mixing the active material of Example 1 or 2, a conductive aid (HS-100, manufactured by DENKI KAGAKU KOGYO KABUSHIKI KAISHA) and a binder (PTFE) at a weight ratio of 70:25:5 was used. As a negative electrode 2, a metal lithium foil (manufactured by HONJO METAL CO., LTD.) was used. As an electrolyte layer 3, a separator (which has three layers of polypropylene/polyethylene/polypropylene) which was impregnated with DST3 (EC:DM:EMC=3:4:3, manufactured by Mitsubishi Chemical Corporation) as an electrolyte was used. The positive electrode 1, the negative electrode 2 and the electrolyte layer 3 were laminated, and the laminate was placed between a positive electrode can 6 and a negative electrode can 7 with a spacer 4 pressed against the laminate by a spring 5. A gasket 8 was used to seal the gap between the positive electrode can 6 and the negative electrode cart 7.

2.2.2. Charge-Discharge Test Conditions and Test Results

A charge-discharge test was conducted on the coin batteries under the following
conditions;
current: 0.2 mA,
cut-off voltage: 1 to 3 V.
cut-off condition:
cc (constant entreat), and
starting the test with discharging.
The results are shown in FIGS. 4 and 5.

Figure 4A:
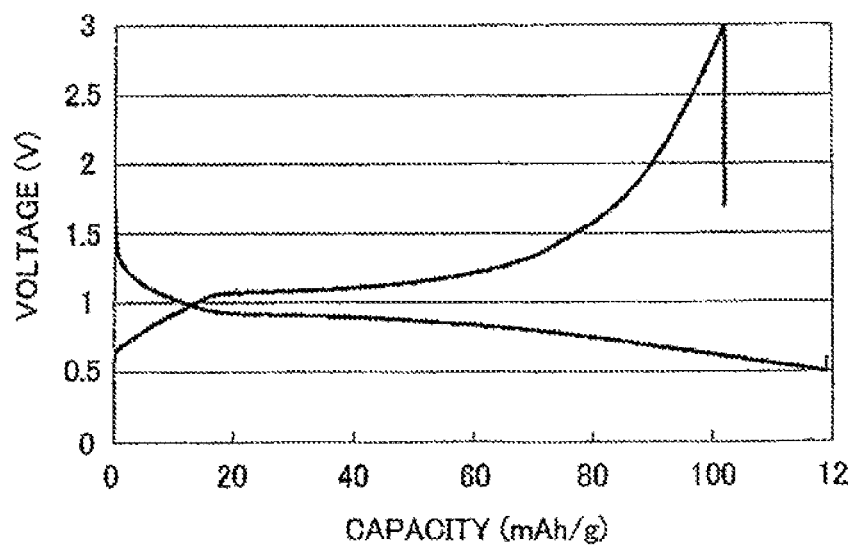
FIG. 4A is a graph that shows the result of a charge-discharge test on $Sc_2TiO_5$.
Figure 4B:
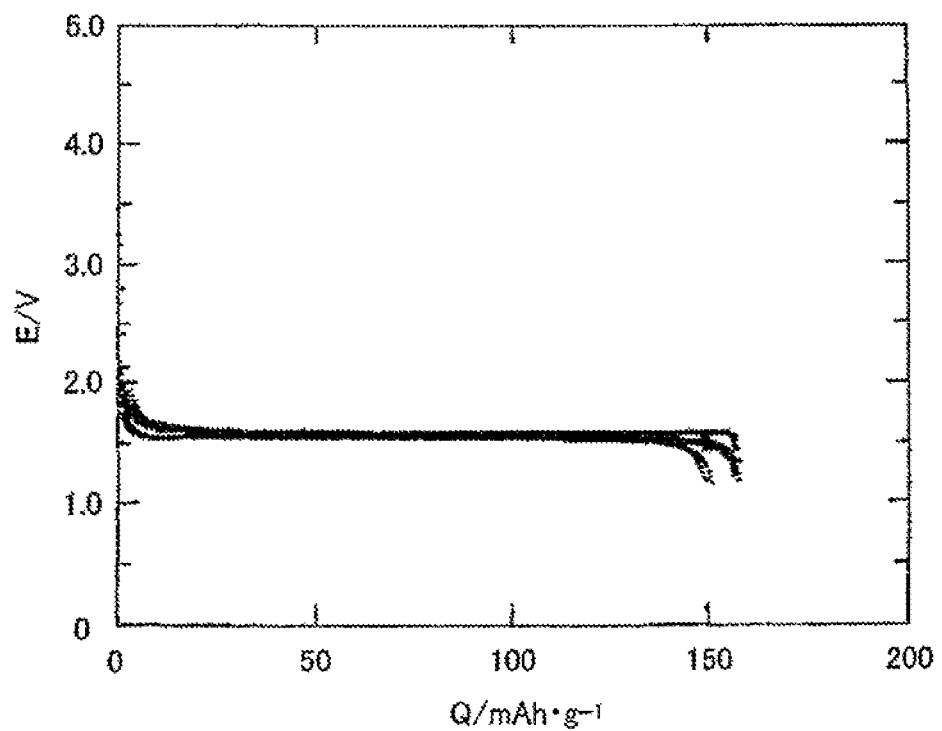
FIG. 4B is a graph that shows the result of a charge-discharge test on a spinel-type lithium titanate ($Li_4Ti_5O_{12}$)

FIG. 4A is a graph that shows the result of the charge-discharge test on $Sc_2TiO_5$. As is clear from FIG. 4A, $Sc_2TiO_5$ underwent a charge-discharge reaction at approximately 1 V. FIG. 4B shows the result of the charge-discharge test on spinel-type lithium titanate ($Li_4Ti_5O_{12}$). As is clear from FIG. 4B, spinel-type lithium titanate underwent a charge-discharge reaction at approximately 1.5 V. These results confirm that $Sc_2TiO_5$ has a lower potential, relative to lithium, than spinel-type lithium titanate and undergoes a charge-discharge reaction at a lower potential than spinel-type lithium titanate.

Figure 5A:
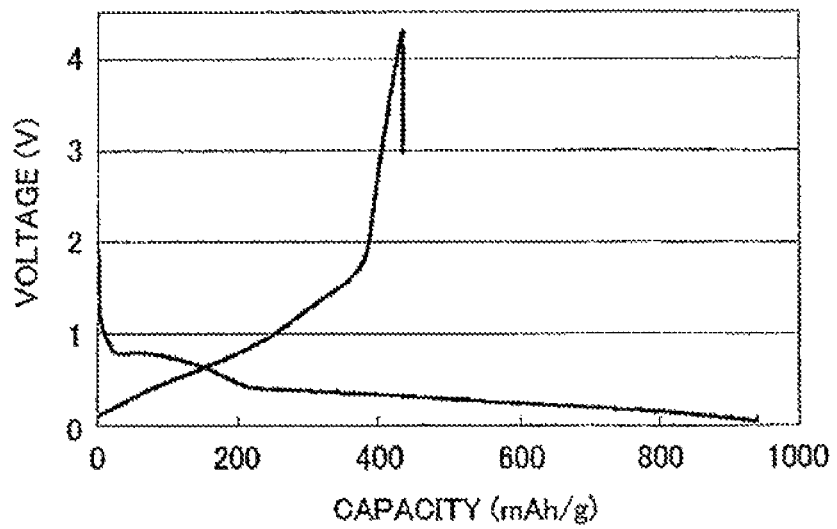
FIG. 5A is a graph that shows the result of a charge-discharge test on $Fe_2TiO_5$.
Figure 5B:
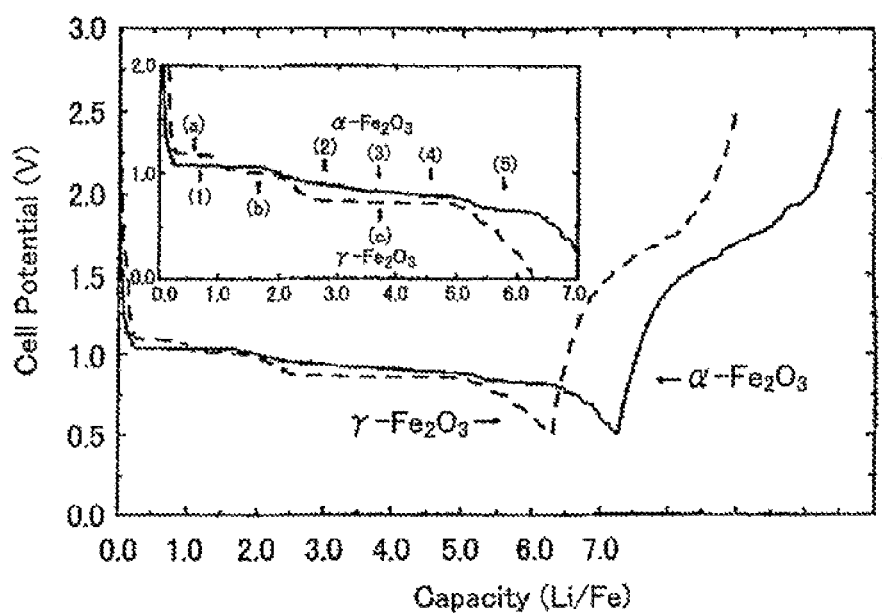
FIG. 5B is a graph that shows the result of a charge-discharge test on $Fe_2O_3$.

FIG. 5A is a graph that shows the result of the charge-discharge test on $Fe_2TiO_5$. As is clear from FIG. 5A, $Fe_2TiO_5$ underwent a discharge reaction at 0.8 V or lower and underwent a charge reaction at 0 to 1.5 V. FIG. 5B shows the result of the charge-discharge test on $Fe_2O_3$. As is clear from FIG. 5B, $Fe_2O_3$ underwent a discharge reaction at approximately 1.0 V and underwent a charge reaction at approximately 1.5 to 1.7 V. These results confirm that $Fe_2TiO_5$ has a lower potential, relative to lithium, than $Fe_2O_3$ and undergoes a charge-discharge reaction at a lower potential than $Fe_2O_3$.

In other words, when used as a negative-electrode active material of a battery, both $Sc_2TiO_5$ and $Fe_2TiO_5$ allows the operating voltage of the battery to be increased to a level at which there is no possibility of precipitation of lithium and allows the production of a battery with a higher voltage and a higher output than is obtained by using spinel-type lithium titanate, $TiO_2$ or $Fe_2O_3$. In addition, as is clear from the results of the charge-discharge tests, $Sc_2TiO_5$ and $Fe_2TiO_5$ both can provide a sufficient capacity when used in a battery.

It is believed that all the active materials of Examples underwent a charge-discharge reaction at a low potential because cations which are not relatively less likely to contribute to an oxidation-reduction reaction in the active materials (Sc in the case of $Sc_2TiO_5$, and Ti in the case of $Fe_2TiO_5$) form ionic bonds with oxygen and increase the covalency of the bonds between cations which contribute to an oxidation-reduction reaction (Ti in the ease of $Sc_2TiO_5$ and Fe in the case of $Fe_2TiO_5$) and oxygen. The above Examples demonstrated the superiority of a compound with a pseudobrookite structure as a negative-electrode active material.

The negative-electrode active material according to this embodiment can be used as a negative-electrode active material of various types of batteries. When a negative electrode that includes the negative-electrode active material according to this embodiment is used to constitute a battery, a high-output and high potential battery with high energy density can be achieved. The battery can be used as a power source for portable devices, electrical vehicles, hybrid vehicles and so on.

What is claimed is:

1. A lithium battery comprising a negative electrode, the negative electrode, comprising:
   a negative-electrode active material which includes a compound that has a pseudobrookite structure;
   a conductive aid; and
   a binder.

2. The lithium battery according to claim 1, wherein the compound is represented by a composition formula $A_2BO_5$, wherein:
   B is a hexavalent cation when A is a divalent cation,
   B is a tetravalent cation when A is a trivalent cation, and
   B is a divalent cation when A is a tetravalent cation.

3. The lithium battery according to claim 2, wherein;
   B is $W^{6+}$ when A is $Ba^{2+}$,
   B is $Si^{4+}$, $Ti^{4+}$, $V^{4+}$ or $Ge^{4+}$ when A is $Al^{3+}$, $Cr^{3+}$, $Fe^{3+}$, $Sc^{3+}$, $Ga^{3+}$, $In^{3+}$ or $Bi^{3+}$, and
   B is $Mg^{2+}$, $Ba^{2+}$, $Cr^{2+}$, $Cu^{2+}$, $Mn^{2+}$ or $Co^{2+}$ when A is $Ti^{4+}$, $V^{4+}$, $Se^{4+}$, $Zr^{4+}$ or $Te^{4+}$.

4. A negative-electrode active material comprising $Fe_2TiO_5$.

5. A negative-electrode active material comprising $Sc_2TiO_5$.

6. The lithium battery according to claim 1, wherein the negative-electrode active material is powdery.

7. The lithium battery according to claim 1, wherein the compound includes a first metal that is a transition metal and a second metal other than the first metal, and wherein the first metal and the second metal bond with oxygen.

8. The lithium battery of claim 1, further comprising:
   a positive electrode, and
   an electrolyte layer that is interposed between the negative electrode and the positive electrode.

9. The lithium battery according to claim 1, wherein the conductive aid is carbon black, Ketjen black, acetylene black, mesocarbon microbeads, coke, carbon fibers, or graphite.

10. The lithium battery according to claim 1, wherein the binder is a fluorine-including resin or an acrylic resin.

11. The lithium battery of claim 8, wherein the electrolyte layer is a liquid electrolyte layer.

\* \* \* \* \*